(12) United States Patent
Igarashi et al.

(10) Patent No.: US 6,339,124 B1
(45) Date of Patent: Jan. 15, 2002

(54) SILICONE RUBBER COMPOSITIONS

(75) Inventors: Minoru Igarashi; Yutaka Hagiwara, both of Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/592,418

(22) Filed: Jun. 12, 2000

(30) Foreign Application Priority Data

Jun. 10, 1999 (JP) .............................. 11-163249

(51) Int. Cl.[7] ................................. C08K 3/36
(52) U.S. Cl. ................. 524/588; 524/492; 524/417; 525/477; 525/478; 528/24; 528/12; 528/14; 528/15; 528/32
(58) Field of Search ................. 524/588, 432, 524/417; 525/477, 478; 528/24, 12, 14, 15, 32

(56) References Cited

U.S. PATENT DOCUMENTS 4,433,096 A 2/1984 Bokerman et al.
4,978,705 A * 12/1990 Lamont

FOREIGN PATENT DOCUMENTS

JP 59-176326 10/1984

* cited by examiner

*Primary Examiner*—Robert Dawson
*Assistant Examiner*—Kuo Liang Peng
(74) *Attorney, Agent, or Firm*—Millen, White, Zelano & Branigan, P.C.

(57) ABSTRACT

A silicone rubber composition comprising an organopolysiloxane containing at least two alkenyl radicals and having a degree of polymerization of at least 100, an organopolysiloxane or organosilane, reinforcing silica, and an alkali metal salt of phosphoric acid has minimized plasticity recovery with time and improved storage stability and cures with an organic peroxide or addition reaction curing agent into a silicone rubber having improved compression set and yellowing resistance.

14 Claims, No Drawings

SILICONE RUBBER COMPOSITIONS

This invention relates to a silicone rubber composition having minimized plasticity recovery with time and improved storage stability and curing into a silicone rubber with improved compression set and yellowing resistance.

BACKGROUND OF THE INVENTION

Because of its weather resistance, electrical properties, compression set, heat resistance, and freeze resistance, silicone rubber has been widely employed in a variety of fields including electric, electronic, automotive, building, medical and food industries. Typical rubber parts include rubber contacts in remote controllers, keyboards, and musical instruments, building gaskets, rolls in copiers and printers such as developing rolls, transfer rolls, charging rolls, and paper feed rolls, vibration dampers in audio equipment, and compact disc packing in computers. The demand for silicone rubber is still increasing. There is a desire to have silicone rubber having further improved properties.

Such silicone rubber is usually used in the form of compositions comprising a polyorganosiloxane having a high degree of polymerization and a reinforcing filler. These compositions are prepared, for example, by mixing the base polymer with the reinforcing filler and various additives in a mixer such as a dough mixer or two-roll mill.

However, silicone rubber compositions loaded with reinforcing silica are known to undergo plasticity recovery with time. One known method for precluding this phenomenon is by treating surfaces of reinforcing silica fines with an organosilazane, organopolysiloxane terminated with a hydroxyl radical, or organosiloxane terminated with an alkoxy radical. This surface treatment is not fully satisfactory.

Also, a method for preparing a silicone rubber composition which changes little with time is disclosed in JP-A 59-176325 as comprising mixing a hydroxyl-terminated polyorganosiloxane having a low viscosity with a filler, adding sulfuric acid or sulfonic acid thereto, and subjecting the organosiloxane to polycondensation into a higher molecular weight one. With this method, the filler is readily blended in the organosiloxane. However, this method has the drawbacks that controlling a degree of polymerization is difficult due to the influence of moisture and the influence of the filler, a relatively large amount of low molecular weight siloxane is produced during polycondensation, and the residual catalyst can detract from heat resistance.

JP-A 59-176326 discloses the polycondensation of a hydroxyl-terminated polyorganosiloxane having a low viscosity in the presence of a basic catalyst. This method have similar drawbacks to the above method.

U.S. Pat. No. 4,978,705 discloses that silicone rubber is improved in flame retardance by blending therein a minor amount of an alkali metal salt of phosphoric acid. The addition of a minor amount of such a phosphoric acid salt is little effective for suppressing plasticity recovery.

Therefore, there is a desire to have a more effective means for improving the plasticity recovery of a reinforcing silica-loaded silicone rubber composition.

SUMMARY OF THE INVENTION

An object of the invention is to provide a silicone rubber composition having minimized plasticity recovery with time and improved storage stability and curing into a silicone rubber with improved compression set and minimized yellowing after secondary vulcanization.

It has been found that when a silicone rubber composition comprising (A) an organopolysiloxane of the following average compositional formula (1) containing at least two alkenyl radicals in a molecule and having a degree of polymerization of at least 100, (B) an alkoxy or hydroxyl-terminated organopolysiloxane or organosilane represented by the following general formula (2), and (C) reinforcing silica having a specific surface area of at least 50 m²/g is blended with (D) an alkali metal salt of phosphoric acid in an amount of 0.1 to 10 parts by weight per 100 parts by weight of the organopolysiloxane (A), the reinforcing silica (C) is uniformly dispersed in the base compound so that plasticity recovery with time is minimized and storage stability is improved. When this silicone rubber composition is cured with an organic peroxide or addition reaction curing agent, the resulting silicone rubber has improved compression set and minimized yellowing after secondary vulcanization.

Accordingly, the invention provides a silicone rubber composition comprising (A) 100 parts by weight of an organopolysiloxane containing at least two alkenyl radicals in a molecule, represented by the following average compositional formula (1):

$$R_n SiO_{(4-n)/2} \quad (1)$$

wherein R which may be the same or different is a substituted or unsubstituted monovalent hydrocarbon radical and n is a positive number of 1.98 to 2.02, said organopolysiloxane having a degree of polymerization of at least 100, (B) 0.5 to 50 parts by weight of an organopolysiloxane or organosilane represented by the following general formula (2):

$$R^2 O(SiR^1{}_2 O)_m R^2 \quad (2)$$

wherein $R^1$ which may be the same or different is a substituted or unsubstituted monovalent hydrocarbon radical, $R^2$ is hydrogen or an alkyl radical, and m is a positive number of 1 to 50, (C) 5 to 100 parts by weight of reinforcing silica having a specific surface area of at least 50 m2/g, and (D) 0.1 to 10 parts by weight of an alkali metal salt of phosphoric acid.

DESCRIPTION OF THE PREFERRED EMBODIMENT

Component (A) of the silicone rubber composition according to the invention is an organopolysiloxane containing at least two alkenyl radicals in a molecule, represented by the following average compositional formula (1).

$$R_n SiO_{(4-n)/2} \quad (1)$$

Herein R, which may be the same or different, is a substituted or unsubstituted monovalent hydrocarbon radical. Included are monovalent hydrocarbon radicals of 1 to 12 carbon atoms, preferably 1 to 8 carbon atoms, for example, alkyl radicals such as methyl, ethyl, propyl and butyl, cycloalkyl radicals such as cyclohexyl, alkenyl radicals such as vinyl, allyl, butenyl and hexenyl, aryl radicals such as phenyl and tolyl, aralkyl radicals such as benzyl and β-phenylpropyl, and substituted ones of these radicals in which some or all of the hydrogen atoms attached to carbon atoms are replaced by halogen atoms or cyano radicals, such as chloromethyl, trifluoropropyl and cyanoethyl. The organopolysiloxane of formula (1) should contain at least two alkenyl radicals in a molecule. Preferably alkenyl radicals, especially vinyl radicals, account for 0.001 to 10 mol%, especially 0.01 to 5 mol% of the R radicals. The preferred organopolysiloxanes are those end-blocked with a triorganosilyl or diorganohydroxysilyl radical, for example, those end-blocked with a trimethylsilyl, dimethylvinylsilyl, dimethylhydroxysilyl or trivinylsilyl radical, and especially having at least one vinyl radical as well. Letter n is a positive number of 1.98 to 2.02.

The organopolysiloxane of formula (1) should also have a degree of polymerization of at least 100, preferably 100 to 100,000, especially 3,000 to 20,000. It is noted that a mixture of organopolysiloxanes which are different in degree of polymerization or structure is also useful as component (A).

Component (B) is an alkoxy or hydroxyl-terminated organopolysiloxane or organosilane represented by the following general formula (2). This component is an agent for treating the reinforcing silica (C) and assists in dispersing the reinforcing silica in the base compound. Additionally, component (B) synergistically cooperates with component (D) for restraining plasticity recovery with time and reducing yellowing after secondary vulcanization.

$$R^2O(SiR^1_2O)_mR^2 \qquad (2)$$

Herein $R^1$, which may be the same or different, is a substituted or unsubstituted monovalent hydrocarbon radical. Included are monovalent hydrocarbon radicals of 1 to 12 carbon atoms, preferably 1 to 8 carbon atoms, for example, alkyl radicals such as methyl, ethyl, propyl and butyl, cycloalkyl radicals such as cyclohexyl, alkenyl radicals such as vinyl, allyl, butenyl and hexenyl, aryl radicals such as phenyl and tolyl, aralkyl radicals such as benzyl and β-phenylpropyl, and substituted ones of these radicals in which some or all of the hydrogen atoms attached to carbon atoms are replaced by halogen atoms or cyano radicals, such as chloromethyl, trifluoropropyl and cyanoethyl. Of these, methyl, vinyl, phenyl and trifluoropropyl are preferred. For compatibility with the organopolysiloxane (A), it is preferred that $R^1$ in formula (2) be the same monovalent hydrocarbon radical as R in formula (1).

$R^2$ is hydrogen or an alkyl radical. Of the alkyl radicals, those of 1 to 8 carbon atoms, especially 1 to 6 carbon atoms are preferred, and methyl, ethyl, propyl and butyl are exemplary. Preferably $R^2$ is hydrogen, methyl or ethyl.

Letter m, which represents the degree of polymerization of the organopolysiloxane of formula (2), is a positive number of 1 to 50, preferably 1 to 30, and especially 1 to 10. With a too higher degree of polymerization, component (B) may be less effective for treating the reinforcing silica (C).

An appropriate amount of component (B) is 0.5 to 50 parts, and preferably 1 to 10 parts by weight per 100 parts by weight of component (A). A silicone rubber composition with a too large amount of component (B) becomes tacky whereas a silicone rubber composition with a too small amount of component (B) is difficult to mill and undergoes substantial plasticity recovery.

The reinforcing silica (C) is used for the purpose of providing silicone rubber with improved mechanical strength. The silica should have a specific surface area of at least 50 m²/g, preferably 100 to 400 m²/g, as measured by the BET method. Exemplary are fumed silica, fired silica and precipitated silica, which may be used alone or in admixture of two or more. If desired, the reinforcing silica prior to use is surface treated with surface treating agents, for example, organopolysiloxanes, organopolysilazanes, chlorosilanes, and alkoxysilanes.

Of the reinforcing silicas, wet silica, is advantageous. In general, precipitated silica is inexpensive, but allows for substantial yellowing after secondary vulcanization. The combination of the invention significantly restrains yellowing even when wet silica is used.

An appropriate amount of component (C) is 5 to 100 parts, and preferably 10 to 70 parts by weight per 100 parts by weight of component (A). Outside the range, silicone rubber compositions are less workable and cure into parts having poor mechanical strength such as tensile strength and tear strength.

Component (D) is an alkali metal salt of phosphoric acid. Mono- di- and tri-alkali metal salts of phosphoric acid are useful while sodium and potassium salts are typical. Illustrative examples include monosodium dihydrogen phosphate, monopotassium dihydrogen phosphate, disodium monohydrogen phosphate, dipotassium monohydrogen phosphate, sodium phosphate, and potassium phosphate. These salts may be used alone or in admixture of two or more. The alkali metal salt of phosphoric acid may be added in any desired form, for example, in solid form or as an aqueous solution of the salt.

An appropriate amount of component (D) is 0.1 to 10 parts, and preferably 0.15 to 5 parts by weight per 100 parts by weight of component (A). Differently stated, component (D) is preferably added in an amount of 0.1 to 5% by weight of the entire silicone rubber composition. Too large amounts of component (D) can detract from heat resistance whereas too small amounts of component (D) allow the composition to undergo substantial plasticity recovery and are ineffective for preventing yellowing.

In addition to the above-described essential components, optional components are added to the silicone rubber composition of the invention if desired. Such optional components include various additives, for example, non-reinforcing silica such as ground quartz and crystalline silica; carbon black such as acetylene black, furnace black and channel black; fillers other than the reinforcing silica (C), such as calcium carbonate; colorants, tear strength modifiers, heat resistance modifiers, flame retardants, acid acceptors, and heat conductivity modifiers; and parting agents. Also useful are dispersants for fillers, for example, organosilazanes such as hexamethylsilazane and dispersants other than the organopolysiloxane or organosilane of formula (2). These optional components may be added in conventional amounts.

In the practice of the invention, the silicone rubber composition may be prepared by uniformly mixing the above-described components in a rubber mixer such as a two-roll mill, Banbury mixer, dough mixer or kneader and optionally effecting heat treatment under atmospheric pressure or in vacuum. An appropriate curing agent is blended in the silicone rubber composition whereupon the composition is cured into a rubbery elastomer having improved compression set. The curing methods used herein include a curing method using an organic peroxide and an addition curing method using an addition crosslinking agent and a catalyst.

In the organic peroxide curing method, there are used organic peroxide curing agents. Preferred curing agents are chlorine-free organic peroxides such as benzoyl peroxide, p-methylbenzoyl peroxide, o-methylbenzoyl peroxide, 2,5-dimethyl-2,5-di-t-butylperoxyhexane, t-butylperoxybenzoate, dicumyl peroxide, and cumyl t-butyl peroxide. Especially for hot air vulcanization, acyl peroxides such as benzoyl peroxide, p-methylbenzoyl peroxide and o-methylbenzoyl peroxide are preferred. These organic peroxides may be used alone or in admixture of two or more. An appropriate amount of the organic peroxide added is 0.1 to 10 parts, and especially 0.3 to 5 parts by weight per 100 parts by weight of the organopolysiloxane (A). Less amounts of the organic peroxide may achieve insufficient crosslinking whereas larger amounts of the organic peroxide may achieve no further increase of cure rate.

The addition curing method uses a conventional addition reaction curing agent, typically an organohydrogenpolysiloxane having at least two, preferably at least three Si—H radicals in a molecule. Such organohydrogenpolysiloxanes are represented by the formula: $R^3_aH_bSiO_{(4-a-b)/2}$ wherein $R^3$ is as defined for R, preferably methyl, phenyl or trifluoropropy, and more preferably methyl, "a" and "b" are positive numbers satisfying $0 \leq a < 3$, $0 < b \leq 3$, and $0 < a+b \leq 3$. Exemplary are methylhydrogenpolysiloxane and copolymers of methylhydrogenpolysiloxane and dimethylpolysiloxane. Of these, those organohydrogenpolysiloxanes having up to about 400 silicon atoms per molecule are preferably used.

The organohydrogenpolysiloxane is blended in the silicone rubber composition in such amounts that 0.5 to 3 mol of Si—H radicals are available per mol of alkenyl radicals in component (A).

A catalyst is used together with the addition reaction curing agent. Useful catalysts are chloroplatinic acid, alcohol-modified products of chloroplatinic acid, complexes of chloroplatinic acid with ethylene or propylene, and complexes of chloroplatinic acid with vinylsiloxane. The addition reaction catalyst is preferably blended so as to give 0.1 to 1,000 ppm, and especially 1 to 500 ppm of platinum metal based on the weight of the organopolysiloxane (A).

The conditions under which the inventive composition is cured are not critical insofar as a sufficient amount of heat to cause decomposition of the curing agent and vulcanization of silicone rubber is applied. The molding method is not critical and may be selected from extrusion molding (with continuous vulcanization), press molding and injection molding. Typical curing conditions, which vary with a particular molding method, include a temperature of about 80 to 400° C. and a time of about 5 seconds to 30 minutes. If desired, secondary vulcanization is effected at about 150 to 250° C. for about 1 to 10 hours.

EXAMPLE

Examples of the invention are given below by way of illustration and not by way of limitation.

Example 1

A base compound I was prepared by mixing 100 parts by weight of an organopolysiloxane consisting of 99.825 mol % of dimethylsiloxane units, 0.15 mol % of methylvinylsiloxane units, and 0.025 mol % of dimethylvinylsiloxane units and having an average degree of polymerization of about 8,000, 40 parts by weight of precipitated silica Nipsil-LP (Nippon Silica K.K.), 4 parts by weight of dimethylpolysiloxane having silanol radicals at both ends, an average degree of polymerization of 4.1 and a viscosity of 15 centistokes at 25° C. as a dispersant, and 1 part by weight of a 20% aqueous solution of disodium monohydrogen phosphate and monosodium dihydrogen phosphate in a weight ratio of 8/2 as a phosphoric salt in a kneader, and heat treating the mixture at 180° C. for one hour.

To base compound I was added 0.4 part by weight of 2,5-dimethyl-2,5-di(t-butylperoxy)hexane as a crosslinking agent. After uniform mixing, the composition was press cured at 165° C. and 100 kgf/cm² for 10 minutes. Secondary vulcanization was then effected at 200° C. for 4 hours. In this way, there were prepared test sheets and test pieces for the measurement of compression set. The test sheets were measured for hardness on JIS A scale. The test pieces were measured for compression set under conditions: 150° C. and 22 hours.

The sample as press cured had a hardness of 50 and a compression set of 22% (150° C./22 hours). The sample as post cured had a hardness of 51 and a compression set of 7% (150° C./22 hours).

Additionally, after base compound I was allowed to stand for 16 hours at 100° C. and cooled, it was placed on a 6-inch two-roll mill where a plasticity recovery behavior was observed. The time taken until the surface became smooth was 15 seconds.

Example 2

A base compound II was prepared by the same procedure as in Example 1 except that the phosphoric salt added was a mixture of disodium monohydrogen phosphate and monosodium dihydrogen phosphate in a weight ratio of 2/8. It was similarly cured and tested.

The sample as press cured had a hardness of 50 and a compression set of 25% (150° C./22 hours). The sample as post cured had a hardness of 52 and a compression set of 10% (150° C./22 hours).

Additionally, after base compound II was allowed to stand for 16 hours at 100° C. and cooled, it was placed on a 6-inch two-roll mill where a plasticity recovery behavior was observed. The time taken until the surface became smooth was 10 seconds.

Example 3

A base compound III was prepared by the same procedure as in Example 1 except that disodium monohydrogen phosphate was added as the phosphoric salt instead of the mixture of disodium monohydrogen phosphate and monosodium dihydrogen phosphate. It was similarly cured and tested.

The sample as press cured had a hardness of 49 and a compression set of 21% (150° C./22 hours). The sample as post cured had a hardness of 52 and a compression set of 9% (150° C./22 hours).

Additionally, after base compound III was allowed to stand for 16 hours at 100° C. and cooled, it was placed on a 6-inch two-roll mill where a plasticity recovery behavior was observed. The time taken until the surface became smooth was 10 seconds.

Example 4

A base compound IV was prepared by the same procedure as in Example 1 except that the amount of the phosphoric salt aqueous solution added was 2.0 parts by weight. It was similarly cured and tested.

The sample as press cured had a hardness of 49 and a compression set of 20% (150° C./22 hours). The sample as post cured had a hardness of 50 and a compression set of 5% (150° C./22 hours).

Additionally, after base compound IV was allowed to stand for 16 hours at 100° C. and cooled, it was placed on a 6-inch two-roll mill where a plasticity recovery behavior was observed. The time taken until the surface became smooth was 5 seconds.

Comparative Example 1

A base compound V was prepared by the same procedure as in Example 1 except that the phosphoric salt was omitted. It was similarly cured and tested.

The sample as press cured had a hardness of 50 and a compression set of 35% (150° C./22 hours). The sample as post cured had a hardness of 55 and a compression set of 15% (150° C./22 hours).

Additionally, after base compound V was allowed to stand for 16 hours at 100° C. and cooled, it was placed on a 6-inch two-roll mill where a plasticity recovery behavior was observed. The time taken until the surface became smooth was 80 seconds.

Comparative Example 2

A base compound VI was prepared by the same procedure as in Example 1 except that the phosphoric salt was omitted and the amount of dimethylpolysiloxane having silanol radicals at both ends added as the dispersant was 5 parts by weight. It was similarly cured and tested.

The sample as press cured had a hardness of 49 and a compression set of 36% (150° C./22 hours). The sample as post cured had a hardness of 55 and a compression set of 14% (150° C./22 hours).

Additionally, after base compound VI was allowed to stand for 16 hours at 100° C. and cooled, it was placed on a 6-inch two-roll mill where a plasticity recovery behavior was observed. The time taken until the surface became smooth was 30 seconds. This compound was found to be sticky to the rolls as compared with Examples 1 to 4 and Comparative Example 1.

Comparative Example 3

A base compound VII was prepared by the same procedure as in Example 1 except that the amount of the phosphoric salt aqueous solution added was 0.15 part by weight. It was similarly cured and tested.

The sample as press cured had a hardness of 50 and a compression set of 33% (150° C./22 hours). The sample as post cured had a hardness of 54 and a compression set of 14% (150° C./22 hours).

Additionally, after base compound VII was allowed to stand for 16 hours at 100° C. and cooled, it was placed on a 6-inch two-roll mill where a plasticity recovery behavior was observed. The time taken until the surface became smooth was 70 seconds.

Comparative Example 4

A base compound VIII was prepared by the same procedure as in Example 1 except that the hydroxylterminated dimethylpolysiloxane was omitted. It was similarly cured and tested.

The sample as press cured had a hardness of 52 and a compression set of 20% (150° C./22 hours). The sample as post cured had a hardness of 54 and a compression set of 5% (150° C./22 hours).

Additionally, after base compound VIII was allowed to stand for 16 hours at 100° C. and cooled, it was placed on a 6-inch two-roll mill where a plasticity recovery behavior was observed. The time taken until the surface became smooth was 105 seconds.

The press-cured samples and post-cured (or secondarily vulcanized) samples of the foregoing Examples and Comparative Examples were visually observed for yellowing. The results are shown in Table 1.

TABLE 1

| | Yellowing | |
|---|---|---|
| | Press-cured | Post-cured |
| Example 1 | NO | NO |
| Example 2 | NO | NO |
| Example 3 | NO | NO |
| Example 4 | NO | NO |
| Comparative Example 1 | NO | Yellowed |
| Comparative Example 2 | NO | Yellowed |
| Comparative Example 3 | NO | Yellowed |
| Comparative Example 4 | NO | NO |

There have been described silicone rubber compositions which have improved storage stability because of minimized plasticity recovery with time and cure into silicone rubber parts with improved compression set and minimized yellowing. The silicone rubber parts thus find use in a variety of fields including electric, automotive, building, medical and food industries.

Japanese Patent Application No. 11-163249 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A silicone rubber composition comprising
   (A) 100 parts by weight of an organopolysiloxane containing at least two alkenyl radicals in a molecule, represented by the following average compositional formula (1):

$$R_nSiO_{(4-n)/2} \quad (1)$$

wherein R which may be the same or different is a substituted or unsubstituted monovalent hydrocarbon radical and n is a positive number of 1.98 to 2.02, said organopolysiloxane having a degree of polymerization of at least 100,
   (B) 0.5 to 50 parts by weight of an organopolysiloxane or organosilane represented by the following general formula (2):

$$R^2O(SiR^1_2O)_mR^2 \quad (2)$$

wherein $R^1$ which may be the same or different is a substituted or unsubstituted monovalent hydrocarbon radical, $R^2$ is hydrogen or an alkyl radical, and m is a positive number of 1 to 50,
   (C) 5 to 100 parts by weight of reinforcing silica having a specific surface area of at least 50 m$^2$/g, and
   (D) 0.1 to 10 parts by weight of an alkali metal salt of phosphoric acid.

2. The silicone rubber composition of claim 1 wherein the reinforcing silica (C) is wet silica.

3. The silicone rubber composition of claim 1 further comprising an organic peroxide curing agent.

4. The silicone rubber composition of claim 1 further comprising an addition reaction curing agent.

5. The silicone rubber composition of claim 1, wherein each R in formula (1) is an alkyl, alkenyl, phenyl, tolyl, benzyl or phenylpropyl radical, each of 1 to 12 carbon atoms, and each optionally substituted by halogen atoms or cyano radicals.

6. The silicone rubber composition of claim 1, wherein the organopolysiloxane of formula (1) is end-blocked with a triorganosilyl or diorganosilyl radical.

7. The silicone rubber composition of claim 1, wherein the organopolysiloxane of formula (1) has a degree of polymerization of 100 to 100,000.

8. The silicone rubber composition of claim 1, wherein the organopolysiloxane of formula (1) has a degree of polymerization of 3,000 to 20,000.

9. The silicone rubber composition of claim 1, wherein each $R^1$ in formula (2) is an alkyl, alkenyl, phenyl, tolyl, benzyl or phenylpropyl radical, each of 1 to 12 carbon atoms, and each optionally substituted by halogen atoms or cyano radicals and each $R^2$ in formula (2) is hydrogen or an alkyl radical of 1 to 8 carbon atoms.

10. The silicone rubber composition of claim 5, wherein the $R^1$ groups in formula (2) are the same as the R groups in formula (1).

11. The silicone rubber composition of claim 1, wherein, in formula (2), m is a positive number of 1 to 30.

12. The silicone rubber composition of claim 1, wherein the amount of component (B) is 1 to 10 parts by weight per 100 parts by weight of component (A), the amount of component (C) is 10 to 70 parts by weight per 100 parts by weight of component (A), and the amount of component (D) is 0.15 to 5 parts by weight per 100 parts by weight of component (A).

13. The silicone rubber composition of claim 1, wherein the reinforcing silica, (C), has a specific surface area of 100 to 400 $m^2/g$, as measured by the BET method.

14. The silicone rubber composition of claim 1, wherein the alkali metal salt of phosphoric acid, (D), is monosodium dihydrogen phosphate, monopotassium dihydrogen phosphate, disodium monohydrogen phosphate, dipotassium monohydrogen phosphate, sodium phosphate, potassium phosphate or a mixture of any of the above.

* * * * *